United States Patent [19]

Manigault

[11] 3,773,532
[45] Nov. 20, 1973

[54] MULLITE-CHROME REFRACTORY
[75] Inventor: Edward L. Manigault, Cincinnati, Ohio
[73] Assignee: The Chas. Taylor's Sons Company, Cincinnati, Ohio
[22] Filed: July 13, 1972
[21] Appl. No.: 271,601

[52] U.S. Cl.......................... 106/59, 106/65, 106/66
[51] Int. Cl............................................. C04b 35/42
[58] Field of Search........................... 106/59, 65, 66

[56] References Cited
UNITED STATES PATENTS
3,669,889   6/1972   Juzvuk et al........................... 106/59

Primary Examiner—James E. Poer
Attorney—R. L. Lehman et al.

[57] ABSTRACT

A new type of mullite brick refractory composition has been produced which contains from 56 to 80 percent mullite, from 6 to 13 percent calcined kyanite, from 5 to 8 percent alumina, from 1 to 9 percent silica and from 4 to 25 percent iron-chromite ore. This new refractory material has increased service life and decreased slag and alkali attack when used in the steel industry.

4 Claims, No Drawings

MULLITE-CHROME REFRACTORY

BACKGROUND OF THE INVENTION

Mullite refractories have been developed in the past for use in the steel industry. More recently, a mullite-chrome oxide refractory material has been produced which is particularly desirable to use in steel industry since this combination produces a superior refractory over mullite refractories. It has been discovered, however, that a new type of mullite refractory has been prepared which has even greater improved properties over those obtained with the mullite-chromic oxide refractories.

SUMMARY OF THE INVENTION

A new refractory composition has been produced which comprises from 56 to 80 percent mullite, from 6 to 13 percent kyanite, from 1 to 9 percent silica and from 4.0 to 25 percent iron-chromite ore, all of the percentages expressed on a weight basis.

This refractory material is prepared by admixing the above ingredients, forming the desired shapes to be produced and then firing the shapes between 1,500°C and 1,650°C.

DESCRIPTION OF THE PREFERRED EMBODIMENTS

It has been discovered that when an iron-chromite ore is added to a mullite refractory composition, a refractory composition is produced which is less porous and is more resistant to slag and alkali attack than either a mullite-body or a chromic oxide-mullite-body.

Iron-chromite ore usually contains from 35 to 50 percent chromic-oxide, from 20 to 35 percent iron oxides and from 20 to 45 percent oxides of silicon, magnesium, calcium and aluminum.

In preparing the ceramic mixture, the mullite should be ground to obtain a size range from $-\frac{1}{4}$ inch through $-325$ mesh. The calcined kyanite should be ground to $-100$ mesh while the iron-chromite ore, silica and aluminum should be ground to $-325$ mesh.

The above ingredients are mixed together with sufficient water and an organic binder to temper the mix and to form the desired shapes which are then fired at 1,500°C to 1,650°C to form the desired refractory material.

In order to describe more fully the instant invention, the following examples are presented:

EXAMPLE 1

In this Example 70.8 kg of mullite and 4.8 kg of iron-chromite ore were mixed with 10.1 kg calcined kyanite, 6.6 kg of alumina and 7.7 kg of silica. The mullite contained a size range of from $-\frac{1}{4}$ inch through $-325$ mesh. The calcined kyanite was ground to $-100$ mesh while the iron-chromite, the alumina and the silica were all ground to $-325$ mesh.

The iron-chromite ore used had the following typical analysis:

| Ingredient | % |
|---|---|
| Chromic oxide | 45.66 |
| Iron oxides | 27.24 |
| Silica | 1.47 |
| Calcium oxide | 0.13 |
| Magnesium oxide | 10.24 |
| Alumina | 15.26 |
| | 100.00 |

The mixture was dry blended for 3 minutes. 3.1 kg of a 30 percent solution of lignin liquor and water were added to the mixture and the mixture was blended for 10 minutes.

Bricks 9 × 4½ × 3 inches were prepared and fired at 1,560°C for 5 hours. The final bricks were examined and possessed the following properties:

Porosity, % — 15.0
Absorption, % — 5.8

The bricks were also subjected to slag and alkali attack tests. These tests are described as follows:

SLAG ATTACK TEST

The brick was heated to 1,425°C in a slag drip furnace and exposed to 300 g of a molten blast furnace slag over a period of about 3 hours. The exposed brick was then removed from the furnace and the cut in the brick caused by the molten slag was measured (volume of the cut).

ALKALI ATTACK TEST

The fired brick was cut into a 2-inch cube and a hole 1¼ inch in diameter and 1 inch deep was cut into the top forming a cup. The cup was filled with 8 g of potassium carbonate and covered with a similar brick-like material. The cube was then heated under reducing conditions at 1,040°C for 5 hours.

The cycle was repeated including reloading of alkali and heating until the cube was damaged severely. The number of cycles employed was recorded as the resistance toward the alkali.

The bricks prepared in this example had the following resistance to attack:

Slag Attack Test, cc — 9.9
Alkali Attack Test, cycles — 8

All of these properties are considerably improved over a mullite brick or a mullite-chromic oxide brick produced by the prior art. The comparative results are shown in the following table along with those of Example 1.

EXAMPLES 2–3

The procedure of Example 1 was repeated except that various amounts of alumina, iron-chromite ore and silica were employed. In Example 2 the amounts of alumina and silica were decreased while in Example 3 the amount of iron-chromite ore was increased five-fold.

Again in all of these examples, improved results were obtained. The results along with the controls are presented in the following table:

EXAMPLE

| | 1 | 2 | 3 | Chromic-Oxide Mullite Control | Mullite Control |
|---|---|---|---|---|---|
| Mullite, kg | 70.8 | 74.3 | 67.6 | 68.6 | 68.6 |
| Kyanite, kg | 10.1 | 10.6 | 10.6 | 8.6 | 8.6 |
| Alumina, kg | 6.6 | 4.6 | | 3.6 | 8.6 |
| Silica, kg | 7.7 | 5.4 | 1.5 | | |
| Iron-Chromite, kg | 4.8 | 5.0 | 22.8 | | |
| Chromic-Oxide, kg | | | | 5.0 | |
| Clay, kg | | | | 14.2 | 14.2 |
| Porosity, % | 15.0 | 15.3 | 15.3 | 16.1 | 17.3 |
| Absorption, % | 5.8 | 5.9 | 5.5 | 6.2 | 6.8 |
| Slag Attack Test, cc | 9.9 | — | — | 10.8 | 15.8 |
| Alkali Attack Test, cycles | 8 | — | 5 | 2 | 1 |

From the above table it is clearly shown that when iron-chromite ore is used in a mullite composition that the absorption and the porosity of the fired bricks are decreased over that obtained with either the prior art mullite composition or a chromic-oxide-mullite composition. In addition the bricks produced by the instant invention are attacked less by both molten slag and alkali than the bricks produced by the prior art.

While this invention has been described and illustrated by the examples shown, it is not intended to be strictly limited thereto, and other variations and modifications may be employed within the scope of the following claims:

I claim:

1. A refractory composition of matter comprising from 56 to 80 mullite, from 6 to 13 percent calcined kyanite, from 5 to 8 percent alumina, from 1 to 9 percent silica and from 4 to 25 percent iron-chromite ore, all of the percentages expressed on a weight basis.

2. A method for producing a refractory composition of matter which comprises admixing from 56 to 80 percent mullite, from 6 to 13 percent calcined kyanite, from 5 to 8 percent alumina, from 1 to 9 percent silica and from 4 to 25 percent iron-chromite ore, forming said mixture into a ceramic shaped body and firing said body at a temperature from 1,500°C to 1,650°C, all of the percentages expressed on a weight basis.

3. Method according to claim 2 in which the iron-chromite ore contains from 20 to 35 percent iron oxides, and from 20 to 45 percent oxides of silicon, magnesium, calcium and aluminum.

4. Method according to claim 2 in which the mullite is of a size from —¼ inch through —325 mesh, the calcined kyanite is —100 mesh and the iron-chromite ore, the alumina and the silica are —325 mesh in size.

* * * * *